United States Patent Office 3,423,369
Patented Jan. 21, 1969

3,423,369
PHOSPHORUS-CONTAINING AMINOPLASTS AND PROCESS FOR THEIR PREPARATION
Hermann Nachbur, Riehen, Alfred Berger, Reinach, Christian Guth, Basel, and Arthur Maeder, Therwil, Switzerland, assignors to Ciba Limited, Basel, Switzerland, a Swiss company
No Drawing. Filed Jan. 14, 1966, Ser. No. 520,669
U.S. Cl. 260—67.6      8 Claims
Int. Cl. C08g 41/00; C09k 3/28

ABSTRACT OF THE DISCLOSURE

New phosphorus-containing aminoplasts are provided which can be considered as having been obtained by replacing the hydrogen atoms attached to the amide nitrogen atoms of an aminoplast former, such as urea or melamine, with at least one group of the formula —$CH_2OR$, wherein R is hydrogen, methyl or ethyl, and at least one group of the formula

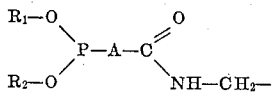

in which $R_1$ and $R_2$ each represent a monovalent aliphatic, cycloaliphatic, araliphatic or aromatic residue which may be substituted by halogen atoms such as chlorine or bromine or may be interrupted by oxygen atoms, and $R_1+R_2$ may also represent a bivalent aliphatic, cycloaliphatic, araliphatic or aromatic residue which may be substituted by halogen or interrupted by oxygen atoms, and A is an alkylene radical.

The phosphorus-containing aminoplasts of this invention are especially useful as flame-proofing agents for fibrous cellulosic textile materials.

---

The present invention provides new curable and water-soluble aminoplasts containing phosphorus which lend themselves particularly well to flame-proofing organic fibrous materials, especially cellulose or textile material containing regenerated cellulose.

The new aminoplasts containing phosphorus contain (a) at least 1 and preferably 1 to 2 groups of the formula (I)      —$CH_2OR$ linked with the amide nitrogen, in which formula R represents an alkyl radical containing 1 or 2 carbon atoms or preferably a hydrogen atom, and furthermore (b) at least 1 and preferably 4 to 5 groups of the formula (II)

linked with amide nitrogen, in which $R_1$ and $R_2$ each represents a monovalent aliphatic, cycloaliphatic, araliphatic or aromatic residue which may be substituted by halogen atoms such as chlorine or bromine or may be interrupted by oxygen atoms, and $R_1+R_2$ may also represent a bivalent aliphatic residue, and A represents a bivalent aliphatic, cycloaliphatic, araliphatic or aromatic residue which may be substituted by halogen or interrupted by oxygen atoms.

The residues $R_1$ and $R_2$ in the above Formula II are preferably each an alkyl or alkenyl group or $R_1+R_2$ stand for an alkenyl group, the total number of the carbon atoms present in $R_1$ and $R_2$ being at least 2 and at most 10. The residue A in the Formula II is preferably an alkylene radical containing 1 to 5 carbon atoms, being more especially a methylene or polymethylene group, which may be unsubstituted or may be substituted by methyl-side groups or halogen atoms such as chlorine or bromine.

The new aminoplasts containing phosphorus are advantageously manufactured by condensing an aminoplast, which has been obtained by condensing formaldehyde with an aminoplast former, the methylol groups of the aminoplast mentioned possibly being partially or fully etherified with an alcohol containing 1 or 2 carbon atoms, and the said aminoplast containing at least 2 and preferably 5 to 6 groups of the formula (I)      —$CH_2OR$ linked with amide nitrogen, where R represents an alkyl radical containing 1 or 2 carbon atoms or preferably a hydrogen atom, with a phosphonamide of the formula (III)

where the residues $R_1$, $R_2$ and A above have the same meanings as in Formula II under such known reaction conditions and at such a molecular ratio of the starting materials that a condensation product is formed which is still curable and soluble and still contains at least 1 and preferably still 1 to 2 unreacted groups of the Formula I.

According to another less advantageous manufacturing process an aminoplast former, which contains at least 2 and preferably 5 to 6 hydrogen atoms linked with amide nitrogen, may be reacted with an N-methylol-phosphonamido compound of the formula (IV)

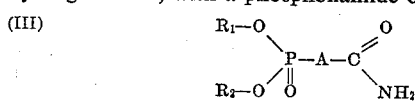

where the residues $R_1$, $R_2$ and A have the same meanings as in Formula II, the starting materials being used at a molecular ratio such that a condensation product is formed which still contains at least 1, preferably 1 to 2 hydrogen atoms linked with amide nitrogen atoms of the residue of the aminoplast former, followed by treatment with formaldehyde or with an agent that gives off formaldehyde under the reaction conditions, such as paraformaldehyde.

As aminoplast formers, from which the new aminoplasts containing phosphorus are derived, there are especially suitable 1,3,5-aminotriazines. In addition to the preferably used melamine there may be mentioned N-substituted melamines such as N-butylmelamine, N,N-diallylmelamine, N-tertiary octylmelamine and N-trihalogenomethylmelamines such as N-trichloromethylmelamine, and also ammeline, ammelide, guanamides such as formoguanamine, acetoguanamine, lauroguanamine, steraoguanamine, $\Delta^3$ - tetrahydrobenzoguanamine, hexahydrobenzoguanamine, benzoguanamine, ortho-, meta- and para-toluguanamine and diguanamines, for example those of the general formula

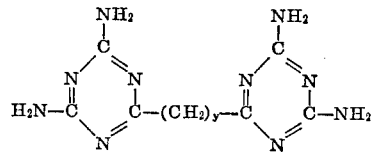

where y is a small whole number, for example from 2 to 8, such as adipoguanamine. Furthermore, also other aminoplast formers are suitable, such as urea, thiourea, cyanamide, dicyandiamide, urethanes, guanidine, guanylthiourea, alkyl- and aryl-urea and -thioureas, alkyleneureas or diureas, such as ethyleneurea and propyleneurea and dihydroxyethyleneurea.

As phosphonamides of the Formula III, from which the phosphorus-containing aminoplasts of this invention are derived, there may be used, for example, compounds of the general formula (V) 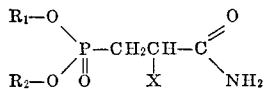

where $R_1$ and $R_2$ have the above meanings and X represents a hydrogen atom or a methyl group or a halogen atom. Such compounds have been described by A. N. Pudovick and D. Kh. Yarmukhametova (Bull. Acad. Sci., U.S.S.R., Div. Chem. Sci. 1952, pages 657–660) and in U.S. Patents No. 2,754,319 and No. 2,764,320. These compounds are obtained, for example, by reacting a phosphite ester of the general formula (VI) 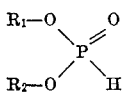

where $R_1$ and $R_2$ have the above meanings—with acrylic acid amide, α - chloracrylamide, α-bromacrylamide or methacrylic acid amide.

Compounds of the above-mentioned kind are, for example 3-(diethyl-phosphono)propionamide,
3-(diallyl-phosphono)propionamide,
(2,3-dichloropropyl-phosphono)propionamide,
3-(diethyl-phosphono)-2-methylpropionamide,
3-(2,2-dimethyltrimethylene-phosphono)propionamide,
3-(1-methyltrimethylene-phosphono)propionamide,
3-[bis-(bromotrichloropropyl)phosphono]propionamide,
3-(diethyl-phosphono)propionamide and especially 3-(dimethyl-phosphono)propionamide.

As further phosphonamides of the Formula III there may be mentioned the compounds of the formula (VII) 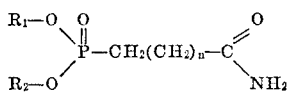

described in U.S. Patent No. 2,875,232, where $R_1$ and $R_2$ have the above meanings and $n=2$, 3 or 4. These compounds can be prepared, for example, by reacting at an elevated temperature a phosphite ester of the general formula (VI) 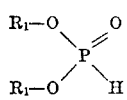

with a lactam of the formula (VIII) 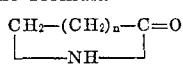

Compounds of the aforementioned kind are, for example 6 - (dibutyl-phosphono)hexanamide, 6-(diethyl-phosphono)hexanamide, 4 - (diethyl - phosphono)butyramide, 6 - (diphenyl-phosphono)hexanamide and 4-(diphenyl-phosphono)butyramide.

In the preferred process for the manufacture of the new phosphorus-containing aminoplasts an aminoplast obtained by condensing an aminoplast former with formaldehyde, especially pentamethylolmelamine or hexamethylolmelamine, is condensed with the phosphonamide of the Formula III, advantageously in the presence of an acid catalyst such as para-toluenesulphonic acid, while heating the reaction mixture and distilling off the water of reaction. The condensation is advantageously carried out in the presence of an inert solvent, for example in benzene.

According to another process for the manufacture of the new phosphorus-containing aminoplasts the aminoplast former is reacted in a single-step operation with formaldehyde and the phosphonamide of the Formula III, that is to say without intermediate isolation of the phosphorus-free aminoplast.

The curable and soluble aminoplasts containing phosphorus obtained according to this invention are suitable for flameproofing organic fibrous materials, such as paper or natural or synethetic textile materials. Particularly good flameproofing effects are obtained by treating native cellulose such as cotton, or regenerated cellulose such as viscose rayon.

Accordingly, the present invention also provides a process for flameproofing organic fibrous materials, especially cellulosic fibrous material such as cotton or viscose rayon, by treating such materials with a preparation containing a phosphorus-containing aminoplast of this invention and then fixing the aminoplast on the material so treated.

The present invention further provides preparations in the form of solutions or emulsions capable of flameproofing organic fibrous materials, especially cellulose or fibrous materials containing regenerated cellulose.

The said preparations contain at least one soluble phosphorus-containing aminoplast of this invention and preferably also another soluble aminoplast and, if desired or required, also a curing catalyst.

By combining the phosphorus-containing aminoplasts of this invention with other aminoplasts, for example restrictedly water-soluble condensates from melamine and formaldehyde, there can be obtained permanently flameproof finishes which at the same time render the cellulosic fibrous material rot proof, that is to say protect it from the attack by microorganisms. The active substance may be applied to the textile material in the form of a solution in an organic solvent such as an alcohol or a chlorinated hydrocarbon or in the form of an aqueous emulsion of such organic solutions. However, the impregnation of the textile material is preferably carried out with an aqueous solution containing water-soluble, phosphorus-containing aminoplasts of this invention, advantageously in combination with other water-soluble aminoplasts.

The total amount of aminoplast to be applied to the fibre ranges in general from 10 to 50%, preferably from 20 to 40%, referred to the weight of the goods to be treated.

The group of water-soluble, curable aminoplasts, preferably used in the performance of the present process, includes both water-soluble and restrictedly water-soluble, curable, possibly etherified, aminoplasts.

Restrictedly water-soluble condensation products within the meaning of this invention are those colloidal intermediates which are at first formed when the condensation is taken beyond the stage of the crystalline methylol; they are characterized in that they can be precipitated from their concentrated aqueous solutions by adding water (cf. Kolloid Zeitschrift, volume LVII, October–December 1931, page 233, lefthand column).

The unrestrictedly water-soluble condensation products are used in the form of aqueous solutions, whereas the restrictedly water-soluble products are used either in the form of solutions of the condensation products solubilized with the aid of acids or in the form of emulsions.

Other suitable aminoplasts, that may be used with advantage in combination with the phosphorus-containing aminoplasts of this invention, are, for example, condensation products of formaldehyde with urea or a urea derivative, such as ethyleneurea, or preferably with a 1,3,5-aminotriazine, such as formoguanamine, acetoguanamine, benzoguanamine or especially melamine.

Particularly good results are achieved with still water-soluble condensation products from 2 to 3 mols of formaldehyde and 1 mol of melamine.

As curing accelerators, which are advantageously incorporated both with the solutions and the emulsions used for textile finishing, there may be used the conventional curing catalysts, for example acids such as hydrochloric, sulphuric or formic acid. There may also be used salts of strong acids with weak bases, for example, magnesuim chloride, zinc nitrate, ammonium salts of strong inorganic acids, such as ammonium chloride, ammonium sulphate, ammonium nitrate, primary ammonium phosphate, ammonium oxalate or ammonium lactate. Solutions of aminoplasts, to which acids have been added, should always be freshly prepared because when kept they undergo undesirable changes.

A preferably used catalyst is an oxidant that can be distributed in water and which, in an aqueous phase, develops a strong binding power neither for alkalies nor for acids and which, once the impregnating liquor has been applied to the fibrous material, accelerates the curing of the aminoplast on the material by way of the formation of oxidation products.

As oxidants, which display a sufficiently strong oxidizing action to oxidize formaldehyde to formic acid when the treated fibrous material is heated or kept for a prolonged period, there are preferably used hydrogen peroxide or its adducts with certain inorganic or organic compounds, for example perborate $NaBO_2.H_2O_2$ or the adduct of hydrogen peroxide with urea. Another suitable oxidant is chlorine dioxide or its stable adducts, especially its adduct with pyridine.

Further suitable oxidants are the salts of peroxy-monosulphuric acid $H_2SO_5$ and of peroxy-disulphuric acid $H_2S_2O_8$, for example their alkali metal salts, especially $Na_2S_2O_8$.

If desired, the preparations of this invention may further contain other known flameproofing additives, for example tetrakis(hydroxymethyl) - phosphonium chloride or tris(aziridin - 1 - yl)phosphine oxide or other textile auxiliaries, for example softeners or ethylene oxide adducts with fatty alcohols.

The impregnation may be carried out in the usual manner and in the usual apparatus.

Quite generally, the permanent flameproof and rotproof finish may be produced by the two-bath process, the material being treated with the solution of the new phosphorus-containing aminoplasts and with the solution of another soluble aminoplast in either order of succession, in which connection it is advantageous to subject the material to a warm fixation before it enters the second bath.

It is, however, preferable to work by the single-bath method, the textile material, preferably cotton or regenerated cellulose, being treated with an aqueous solution containing an at least partially water-soluble phosphorus-containing aminoplast of this invention, another at least partially soluble, known aminoplast and preferably an acid or latently acid catalyst, whereupon the impregnated material is heat-set by a known method. In this manner permanent, excellently flameproof and rotproof finishes are obtained in a single step.

In order not to impair the tear strength of the textile goods by the heat-setting operation, the known procedure may be adopted according to which the impregnated material is mechanically freed from any excess of impregnating liquor, then the aminoplasts in and on the fibres are converted into the water-insoluble state, without drying off the water stemming from the impregnating liquor and retained by the fibre before the resin has been completely cured so that the condensation takes place in the presence of water.

This preferred variant of the process may be applied to all cellulosic fibres such as cotton, spun rayon, jute, manila hemp, sisal and ramie; it is particularly suitable for treating cotton fabrics intended for clothing and tenting materials. The method is specially advantageous wherever cellulosic textile materials are exposed to fire risks and where in addition to good flameproofness of the fabric also optimum mechanical strength after repeated washing is demanded and where, in addition, the textile goods are also required to be stable to rotting.

In contradistinction to the usual curing of the aminoplast, referred to as dry-curing or heat-setting, the curing method used in this preferred variant of the present process, which is carried out in the presence of water, is referred to as wet-setting. The wet-setting is carried out by treating the impregnated goods in a bath containing the water-soluble aminoplast as well as a suitable reaction accelerator, without previous drying, at room tempertture or with heating. It is advantageous to perform the setting at an elevated temperature, using as the main source of heat direct steam, if required or desired under superatmospheric pressure.

The setting of the aminoplasts may be carried out completely without first drying the impregnated fibrous goods or with partial drying before or during the wet-setting operation, provided that the drying proceeds evenly, without disturbing migration of the cured products. In the simplest method the fibrous material is impregnated with a solution or emulsion, then the excess liquor is removed mechanically by squeezing or on a centrifuge, and then stored for some length of time without preliminary drying and while preventing it from drying out too soon. This storing time may vary from a few minutes to several days; it depends on one hand on the aminoplasts and reaction accelerators used and, on the other hand, on the storing temperature. The goods may be stored at room temperature or at an elevated temperature, for example at 80° C. It has proved advantageous to store the impregnated fibrous material in a closed vessel because in this manner premature drying out is automatically prevented. After having cured the resin the fibrous material is dried. As mentioned above the process of this invention may include a partial drying operation before or during the curing of the resin; in this operation it must be ensured that individual parts of the textile goods are not overdried and that any unfixed portion of the resin does not migrate during the drying, since otherwise the success of the treatment might be adversely affected. Even drying can be achieved, for example, by storing the impregnated fibrous goods in a drying cabinet through which a current of air having a predetermined degree of relative humidity is passed. The goods can then only give off humidity until their residual humidity becomes equal to that of the current of air passing over them.

The degree to which this drying can be taken cannot be stated in general terms because several factors, such as storing temperature or the activity of the curing catalyst, have to be taken into consideration.

According to a particularly advantageous variant of the present process wet-setting can be achieved simply and quickly by using as the heat of source steam instead of hot air having a more or less great content of water vapour. When saturated steam is used there is no risk of local drying out. When working at an elevated temperature, for example at 110 to 120° C. under superatmospheric pressure, a much shorter setting time may be used so that the whole process, including the initial heating time, may be concluded within 1 to 2 hours or even much sooner still.

It must be ensured that the water formed from the steam leaving the wet fibrous material during the initial heating period is absorbed by the material without causing the impregnating solution to flow out. This is best achieved by an extensive removal of the excess of impregnating solution by squeezing, centrifuging or sucking.

Percentages in the following examples are by weight. The washing test according to SNV-4 means a wash at a goods-to-liquor ratio of 1:50 (referred to the fibrous material) using a washing liquor which contains, per litre, 5 g. of soap and 2 g. of calcined soda for 30 minutes at 95° C.

The test for flameproofness is carried out by the vertical method according to DIN-53-906 as follows: A conventional Bunsen burner is used and its bright flame is adjusted to a height of 4 cm. A specimen of the fabric, 7 x 15 cm., taken from the warp and weft direction, is suspended so that it dips into the flame to a depth of 2 cm. After a certain test time, depending on the weight of the fabric, the flame is removed and there are measured: the flaming time in seconds, the glow time in seconds, the tear strength or the charred zone in cm.

TEST TIMES

| Weight of goods, grams/m.$^2$: | Seconds |
|---|---|
| Up to 100 | 4 |
| 100 to 200 | 6 |
| 200 to 300 | 8 |
| 300 to 500 | 10 |
| 500 to 750 | 12 |
| 750 to 1000 | 14 |

The guide rule for assessing the flameproofness is that a flaming time of 1 to 2 seconds characterizes a very good finish.

The fabric must not glow after extinction of the flame.

Example 1

122.4 grams (0.4 mol) of hexamethylolmelamine, 289.6 g. of 3-(dimethylphosphono)propionamide (1.6 mols) and 1.2 g. of para-toluenesulphonic acid are suspended in 1 kg. of commercial benzene contained in a 2-litre flask with ground stopper and equipped with a water separator and an agitator. While stirring the batch it is heated to the reflux temperature of the benzene, and the water of reaction formed is collected in the water separator. The reaction is complete when water no longer separates. In all, about 33 ml. of water are collected. The batch is allowed to cool to room temperature, the benzene is decanted and the reaction product, which forms a glassy, brittle substance, is dissolved in 1 kg. of desalted water at 40 to 50° C. After cooling to room temperature the solution is filtered through a paper filter to free it from traces of insoluble matter and then completely freed from water and traces of benzene in a rotary evaporator at a bath temperature of 85° C. under vacuum.

The resulting condensation product A is a solid, opalescent substance which turns viscid when heated. Its dry content is substantially 100%. The product dissolves readily in warm and in cold water.

Example 2

30.6 grams of hexamethylolmelamine, 72.4 g. of 3-(dimethylphosphono)propionamide and 0.9 g. of para-toluenesulphonic acid are suspended in 250 g. of benzene in the apparatus described in Example 1, and the batch is treated at the boiling point of benzene until no more water collects in the water separator. After a reaction time of 7 hours a total of about 7.5 ml. of water has collected and the reaction is complete. After cooling to room temperature the benzene is decanted and the reaction product, which forms a brittle, compact substance, is dissolved in a mixture of 150 g. of isopropanol and 150 g. of water while stirring at 80° C. The solution is filtered to remove impurities and then extensively freed from isopropanol under vacuum at about 45° C.

There are obtained about 140 g. of a yellowish, slightly turbid aqueous solution of condensation product B which has a dry content of 66.7%.

Example 3

A cotton fabric (weighing 220 g./m.$^2$) is padded with an aqueous liquor containing 240 g./litre of the phosphorus-containing condensation product A (100% dry content) prepared as described in Example 1,
240 g./litre of a water-soluble condensation product from 1 mol of melamine and 2–3 mols of formaldehyde,
10 ml./litre of hydrogen peroxide of 35% strength,
2 ml./litre of formic acid of 85% strength.

After padding the weight of the fabric has increased by 80%. The fabric is wrapped in a polyethylene film and stored in the wet for 12 hours at 60° C. (wet-setting)

The test for flameproofness was carried out with fabric specimens in the original state and after 5, 10 and 30 SNV–4 washes with boiling.

The test method used was the method according to DIN–53–906, the flaming time, glow time and tear strength of the charred zone being measured 8 seconds after putting the flame to the fabric. The following results were recorded:

(1) SPECIMENS TAKEN IN THE WARP DIRECTION

| State of Specimen | Flaming time after 8 secs. | Glow time after 8 secs. | Tear length, cm. |
|---|---|---|---|
| Original | 0 | 0 | 5 |
| After 5×SNV–4 | 0 | 0 | 5 |
| After 10×SNV–4 | 0 | 0 | 5.5 |
| After 30×SNV–4 | 0 | 0 | 6.5 |

(2) SPECIMENS TAKEN IN THE WEFT DIRECTION

| State of Specimen | Flaming time after 8 secs. | Glow time after 8 secs. | Tear length, cm. |
|---|---|---|---|
| Original | 0 | 0 | 5 |
| After 5×SNV–4 | 0 | 0 | 6 |
| After 10×SNV–4 | 0 | 0 | 6 |
| After 30×SNV–4 | 0 | 0 | 6.5 |

Example 4

300 grams of a solution prepared as described in Example 2 of condensation product B (dry content 66%) are mixed with a solution heated to 25–30° C. of 200 g. of dimethylolmelamine in 400 g. of water. To this mixture are then added 20 g. of a reaction product from 1 mol of a commercial oleyl alcohol with 6 to 7 mols of ethylene oxide, as well as 20 g. of hydrogen peroxide of 35% strength, the whole is made up with water to 1 kg. and its pH is adjusted to 5.5 to 5.8 with 5 g. of concentrated formic acid. A cotton fabric is treated with this solution at room temperature, padded and then squeezed to a weight increase of 100% and in the moist state stored in a tightly closed vessel for 4 hours at about 90° C. and finally dried. The fabric finally displays a very good flameproof finish which is completely intact even after 6 SNV–4 washes at the boil and the fabric has a soft handle.

Example 5

A mixture of 12.6 g. of melamine, 22.5 g. of paraformaldehyde, 72.4 g. of 3-(dimethylphosphono)propionamide, 0.4 g. of para-toluenesulphonic acid and 100 g. of isobutanol is heated with stirring to the boiling point (180° C.) in a ½ litre stirring flask equipped with thermometer and reflux condenser. After 6 hours a practically clear solution has formed. The isobutanol is expelled under vacuum and the residual viscid substance is mixed, while still warm, with 100 g. of deionized water and stirred until all has dissolved, during which operation the temperature is allowed to drop gradually to 20 to 25° C. There are obtained 218 g. of a syrupy solution of opalescent transparency having a dry content of 48% and a pH of 3.8.

400 grams of this solution are mixed with 50 g. of 97% hexamethylolmelamine tetramethyl ether, 4 g. of ammonium chloride are added and the whole is made up to 1000 ml. of treatment liquor by adding 273 g. of isopropanol and 273 g. of water. A cotton fabric is treated with this solution at room temperature, padded and then squeezed to a weight increase of 100%, died at 60° C. and hardened for 5 minutes at 150° C. The resulting flameproof finish is very good and remains completely intact even after 5 SNV–4 washes at the boil.

What is claimed is:

1. A new phosphorus-containing, curable and water-soluble minoplast precondensate containing (a) at least one group of the formula (I)           —CH₂OR linked with amide nitrogen of the aminoplast precondensate, where R represents a member selected from the group consisting of a methyl radical, an ethyl radical and a hydrogen atom, as well as (b) at least one group of the formula (II) 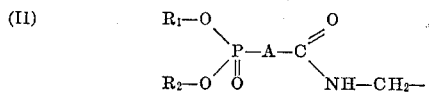

linked with amide nitrogen, where $R_1$ and $R_2$ each represents a member selected from the group consisting of a monovalent aliphatic, cycloaliphatic, araliphatic, aromatic, halogen-substituted aliphatic, halogen-substituted cycloaliphatic, halogen-substituted araliphatic, halogen-substituted aromatic radical and radicals of the type just listed interrupted by oxygen atoms, and where $R_1+R_2$ also represent together a bivalent radical, and A represents a member selected from the group consisting of a bivalent aliphatic, cycloaliphatic, araliphatic, aromatic, halogen-substituted aliphatic, halogen-substituted cycloaliphatic, halogen-substituted araliphatic, halogen-substituted aromatic radical and radicals of the type just listed interrupted by oxygen atoms.

2. A new phosphorus-containing, curable and water-soluble aminoplast precondensate according to claim 1, containing (a) at least one group of the formula (I)           —CH₂OR linked with amide nitrogen of the aminoplast precondensate, where R represents a member selected from the group consisting of a methyl radical, ethyl radical and a hydrogen atom, as well as (b) at least one group of the formula (II) 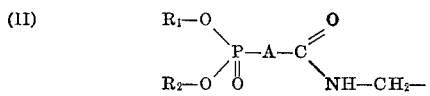

linked with amide nitrogen, where $R_1$ and $R_2$ each represents a member selected from the group consisting of an alkyl and an alkenyl group, and $R_1+R_2$ also represent an alkylene group, the total number of carbon atoms in $R_1$ and $R_2$ being at least 2 and at most 10, and A represents a member selected from the group consisting of a bivalent aliphatic, cycloaliphatic, araliphatic, aromatic, halogen-substituted aliphatic, halogen-substituted cycloaliphatic, halogen-substituted araliphatic, halogen-substituted aromatic radical and radicals of the type just listed interrupted by oxygen atoms.

3. A new phosphorus-containing, curable and water-soluble aminoplast precondensate according to claim 1, containing (a) at least one group of the formula (I)           —CH₂OR linked with amide nitrogen of the aminoplast precondensate, where R represents a member selected from the group consisting of a methyl radical, ethyl radical and a hydrogen atom, as well as (b) at least one group of the formula (II) 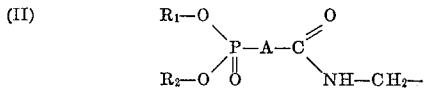

linked with amide nitrogen, where $R_1$ and $R_2$ each represents a member selected from the group consisting of an alkyl and an alkenyl group, and $R_1+R_2$ also represent an alkylene group, the total member of carbon atoms in $R_1$ and $R_2$ being at least 2 and at most 10, and A represents an alkylene radical containing 1 to 5 carbon atoms selected from the group consisting of unsubstituted radicals and radicals substituted by methyl side groups.

4. A new phosphorus-containing, curable and water-soluble aminoplast precondensate according to claim 1, derived from a member selected from the group consisting of a pentamethylolmelamine and a hexamethylolmelamine, in which 4 to 5 of the methylol groups of said member are replaced by a radical of the formula (II) 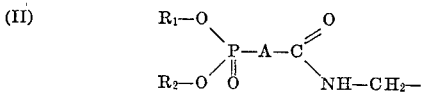

where the radicals $R_1$ and $R_2$ each represents a member selected from the group consisting of an alkyl and an alkenyl group, and $R_1+R_2$ also represent an alkylene group, the total member of carbon atoms in $R_1$ and $R_2$ being at least 2 and at most 10, and A represents an alkylene radical containing 1 to 5 carbon atoms selected from the group consisting of unsubstituted radicals and radicals substituted by methyl side groups.

5. A new phosphorus-containing, curable and water-soluble aminoplast precondensate according to claim 1, derived from a member selected from the group consisting of a pentamethylolmelamine and a hexamethylolmelamine, in which 4 to 5 methylol groups of said member are replaced by a radical of the formula

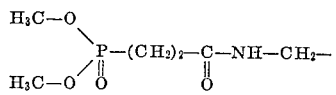

6. A new phosphorus-containing, curable and water-soluble aminoplast precondensate according to claim 1, which is obtained by reacting 1 mol of a member selected from the group consisting of a pentamethylolmelamine and a hexamethylolmelamine with 4 mols of 3-(dimethylphosphono)propionamide.

7. A new phosphorus-containing, curable and water-soluble aminoplast precondensate according to claim 1, which is obtained by reacting 1 mol of hexamethylolmelamine with 4 mols of 3-(dimethylphosphono)propionamide.

8. Process for the manufacture of a new phosphorus-containing, curable and water-soluble aminoplast precondensate according to claim 1, which comprises condensing: an aminoplast obtained by condensing formaldehyde with an aminoplast former in which the methylol groups of the aminoplast mentioned are etherified with an alcohol containing 1 to 2 carbon atoms and in which the aminoplast mentioned contains at least 2 groups of the formula (I)           —CH₂OR linked with amide nitrogen—where R represents a member selected from the group consisting of a methyl radical, an ethyl radical and a hydrogen atom—with a phosphonamide of the formula (II) 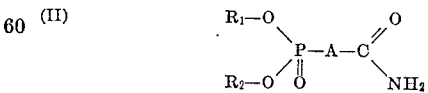

where $R_1$ and $R_2$ each represents a member selected from the group consisting of a monovalent aliphatic, cycloaliphatic, araliphatic, aromatic, halogen-substituted aliphatic, halogen-substituted cycloaliphatic, halogen-substituted araliphatic, halogen-substituted aromatic radical and radicals of the type just listed interrupted by oxygen atoms, and where $R_1+R_2$ also represent together a bivalent radical, and A represents a member selected from the group consisting of a bivalent aliphatic, cycloaliphatic, araliphatic, aromatic, halogen-substituted aliphatic, halogen-substituted cycloaliphatic, halogen-substituted araliphatic, halogen-substituted aromatic radical and radicals of the type just listed interrupted by oxygen atoms, under such known reaction conditions and at such a molecular ratio of the starting materials that a still curable and water soluble condensation product is obtained which still contains 1 to 2 unreacted groups of Formula I.

References Cited

UNITED STATES PATENTS

| | | | |
|---|---|---|---|
| 2,754,319 | 7/1956 | Johnston | 260—461 |
| 2,754,320 | 7/1956 | Johnston | 260—461 |
| 2,828,228 | 3/1958 | Glade et al. | 117—136 |
| 2,875,232 | 2/1959 | McConnell et al. | 260—461 |
| 3,210,350 | 10/1965 | D'Alelio | 260—24.8 |
| 3,351,617 | 11/1967 | Jaeger et al. | 260—78.5 |
| 2,596,937 | 5/1952 | Nielsen | 260—39 |

OTHER REFERENCES

Amino Resins, Blais, 1959, pp. 143–145, and 158–160.

WILLIAM H. SHORT, *Primary Examiner.*

H. SCHAIN, *Assistant Examiner.*

U.S. Cl. X.R.

260—33.4, 33.8, 29.4, 856, 70, 67.7; 117—137

UNITED STATES PATENT OFFICE
CERTIFICATE OF CORRECTION

Patent No. 3,423,369                                                          January 21, 1969

Hermann Nachbur et al.

It is certified that error appears in the above identified patent and that said Letters Patent are hereby corrected as shown below:

In the heading to the printed specification, line 8, after "Ser. No. 520,669" insert -- Claims priority, application Switzerland, Feb. 4, 1965, 1,540/65 --.

Signed and sealed this 14th day of April 1970.

(SEAL)
Attest:

Edward M. Fletcher, Jr.                             WILLIAM E. SCHUYLER, JR.
Attesting Officer                                                 Commissioner of Patents